(12) United States Patent
    Haddock

(10) Patent No.: US 9,086,185 B2
(45) Date of Patent: Jul. 21, 2015

(54) MOUNTING DEVICE USING A LIFTING CLAMPING ACTION FOR INSTALLATION ON PANEL ASSEMBLY

(71) Applicant: Dustin M. M. Haddock, Colorado Springs, CO (US)

(72) Inventor: Dustin M. M. Haddock, Colorado Springs, CO (US)

( * ) Notice: Subject to any disclaimer, the term of this patent is extended or adjusted under 35 U.S.C. 154(b) by 64 days.

(21) Appl. No.: 13/724,976

(22) Filed: Dec. 21, 2012

(65) Prior Publication Data

US 2013/0161462 A1      Jun. 27, 2013

Related U.S. Application Data

(60) Provisional application No. 61/579,987, filed on Dec. 23, 2011.

(51) Int. Cl.
| | |
|---|---|
| *F16B 5/06* | (2006.01) |
| *F16M 13/02* | (2006.01) |
| *F24J 2/52* | (2006.01) |
| *F16B 2/12* | (2006.01) |
| *F24J 2/46* | (2006.01) |

(52) U.S. Cl.
CPC .................. *F16M 13/02* (2013.01); *F16B 2/12* (2013.01); *F16B 5/06* (2013.01); *F24J 2/5249* (2013.01); *F16B 5/065* (2013.01); *F16B 5/0635* (2013.01); *F24J 2002/4661* (2013.01); *Y02E 10/47* (2013.01); *Y10T 29/49826* (2015.01)

(58) Field of Classification Search
USPC .................. 248/228.3, 228.5, 231.41, 231.61, 248/229.24, 229.22, 229.14, 229.12; 24/525, 569; 269/3, 6, 95, 43, 143, 249
See application file for complete search history.

(56) References Cited

U.S. PATENT DOCUMENTS

| | | | | | |
|---|---|---|---|---|---|
| 2,574,007 | A | * | 11/1951 | Anderson ...................... | 248/662 |
| 3,288,409 | A | * | 11/1966 | Bethea, Jr. ...................... | 248/62 |
| 4,799,444 | A | * | 1/1989 | Lisowski .................. | 114/221 R |
| 4,895,338 | A | * | 1/1990 | Froutzis ..................... | 248/503.1 |
| 5,413,063 | A | * | 5/1995 | King ......................... | 114/221 R |
| 5,482,234 | A | * | 1/1996 | Lyon ............................ | 248/74.5 |
| 5,598,785 | A | * | 2/1997 | Zaguroli, Jr. ................. | 104/111 |
| 6,336,616 | B1 | * | 1/2002 | Lin .......................... | 248/222.11 |
| 6,364,262 | B1 | * | 4/2002 | Gibson et al. ............ | 248/229.14 |
| 7,386,922 | B1 | * | 6/2008 | Taylor et al. .................... | 24/569 |
| 2010/0193651 | A1 | * | 8/2010 | Railsback et al. ....... | 248/229.24 |

FOREIGN PATENT DOCUMENTS

| | | |
|---|---|---|
| CN | 202025767 | 11/2011 |
| DE | 202007002252 | 4/2007 |
| JP | 2003-155803 | 5/2003 |
| KR | 100957530 | 5/2010 |

\* cited by examiner

*Primary Examiner* — Alfred J Wujciak
(74) *Attorney, Agent, or Firm* — Marsh Fischmann & Breyfogle LLP

(57) ABSTRACT

A mounting device (50) having a first clamping member (60) and a second clamping member (90) is disclosed. At least one clamp fastener (114) of the mounting device (50) movably interconnects the clamping members (60, 90). Rotating the clamp fastener(s) 114 in one direction moves the second clamping member (90) both laterally and upwardly toward the first clamping member (60), which in one embodiment entails moving the second clamping member (90) along an axial path.

28 Claims, 10 Drawing Sheets

MOUNTING DEVICE USING A LIFTING CLAMPING ACTION FOR INSTALLATION ON PANEL ASSEMBLY

CROSS-REFERENCE TO RELATED APPLICATIONS

This patent application is a non-provisional patent application of, and claims priority to, U.S. Provisional Patent Application Ser. No. 61/579,987, that was filed on 23 Dec. 2011, and the entire disclosure of which is hereby incorporated by reference in its entirety herein.

FIELD OF THE INVENTION

The present invention generally relates to mounting devices for panel assemblies having a plurality of panel joints (e.g., standing seams, ribs) that are spaced along the panel assembly.

BACKGROUND

Metal panels are being increasingly used to define building surfaces such as roofs and sidewalls. One type of metal panel is a standing seam panel, where portions of adjacent standing seam panels of the building surface are interconnected/nested in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that increasing the number of locations where a metal panel building surface is punctured may increase the potential for leakage and/or corrosion.

SUMMARY

The present invention generally pertains to mounting devices for a panel assembly. The panel assembly is formed by interconnecting a plurality of panels. Generally, an edge portion of one panel may be interconnected (e.g., nested) with an edge portion of an adjacent panel. The resulting structure may be characterized as "panel joint." Each panel joint extends at least generally upward relative to the primary span of the panel assembly (the "primary span" being collectively defined by the length and width dimensions of the panel assembly), and the length dimension of the panel joint will typically coincide with a pitch when used as a roofing surface. Representative panel joints include without limitation a hollow rib, a standing seam, a bulb seam, a double fold seam, or the like.

A first aspect of the invention is embodied by a mounting device that may be attached/installed on a panel joint of a panel assembly. This mounting device includes first and second clamping members, along with at least one clamp fastener. The first clamping member includes a mounting flange, a first transition section, and a first panel joint capture section, with the first transition section being located between the mounting flange and the first panel joint capture section. The second clamping member includes a second transition section and a second panel joint capture section that are disposed in at least generally opposing relation to the first transition section and first panel joint capture section, respectively, of the first clamping member. The clamp fastener extends through the first transition section of the first clamping member and at least extends into the second transition section of the second clamping member.

A panel joint receptacle is collectively defined by the first and second panel joint capture sections and is in the form of an open space in the case of the first aspect. A first reference plane is orthogonal to a width dimension of this panel joint receptacle, where the width dimension corresponds with the direction in which the first and second clamping members are spaced from one another. An included angle between the first transition section of the first clamping member and the first reference plane is within a range of about 20° to about 40°.

A second aspect of the invention is embodied by a mounting device that may be attached/installed on a panel joint of a panel assembly. This mounting device includes first and second clamping members, along with at least one clamp fastener. The first clamping member includes a mounting flange, a first transition section, and a first panel joint capture section, with the first transition section being located between the mounting flange and the first panel joint capture section. The second clamping member includes a second transition section and a second panel joint capture section that are disposed in at least generally opposing relation to the first transition section and first panel joint capture section, respectively, of the first clamping member. The clamp fastener extends through the first transition section of the first clamping member and at least extends into the second transition section of the second clamping member.

A panel joint receptacle is collectively defined by the first and second panel joint capture sections and is in the form of an open space in the case of the second aspect. A first reference plane is orthogonal to a width dimension of this panel joint receptacle, where the width dimension corresponds with the direction in which the first and second clamping members are spaced from one another. An included angle between a length dimension of the clamp fastener and the first reference plane is within a range of about 50° to about 70°.

A third aspect of the invention is embodied by a mounting device that may be attached/installed on a panel joint of a panel assembly. This mounting device includes first and second clamping members, along with at least one clamp fastener. The first clamping member includes a mounting flange, a first transition section, and a first panel joint capture section, with the first transition section being located between the mounting flange and the first panel joint capture section. The second clamping member includes a second transition section and a second panel joint capture section that are disposed in at least generally opposing relation to the first transition section and first panel joint capture section, respectively, of the first clamping member. The clamp fastener extends through the first transition section of the first clamping member and at least extends into the second transition section of the second clamping member.

A panel joint receptacle is collectively defined by the first and second panel joint capture sections and is in the form of an open space in the case of the third aspect. A first reference plane is orthogonal to a width dimension of this panel joint receptacle, where the width dimension corresponds with the direction in which the first and second clamping members are spaced from one another. The second clamping member moves axially along a path that is neither parallel with nor orthogonal to the first reference plane.

A number of feature refinements and additional features are separately applicable to each of the first, second, and third aspects of the present invention. These feature refinements and additional features may be used individually or in any combination. The following discussion is separately applicable to each of the first, second, and third aspects, up to the start of the discussion of a fourth aspect of the present invention.

The mounting flange may be disposed in any appropriate orientation. One embodiment has the mounting flange being at least generally horizontally disposed relative to a panel assembly when the mounting device is installed on a panel joint of this panel assembly (e.g., "horizontally disposed" being at least generally parallel with a plane containing the length and width dimensions of the panel assembly—the general span of the panel assembly). Another embodiment has the mounting flange being at least generally vertically disposed relative to a panel assembly when the mounting device is installed on a panel joint of this panel assembly (e.g., disposed at least generally perpendicular or orthogonal to a plane containing the length and width dimensions of the panel assembly).

An included angle may exist between the mounting flange and the first transition section, and this included angle may be at least about 110° and less than 180° in the case of the above-noted horizontally disposed mounting flange. One embodiment has this included angle being within a range of about 110° to about 130°, while another embodiment has this included angle being about 120°. This included angle may be defined between an underside of the mounting flange and an underside of the first transition section (e.g., surfaces of the mounting flange and the first transition section that would project at least generally in the direction of or face a panel assembly when the mounting device is installed on a panel joint of this panel assembly).

An included angle may exist between a length dimension of the clamp fastener and the mounting flange, and this included angle may be within a range of about 20° to about 40° in one embodiment, and may be about 30° in another embodiment in the case of the above-noted horizontally disposed mounting flange. The length dimension of the clamp fastener may coincide with an axis about which the clamp fastener may rotate when moving the mounting device between an open or non-clamping position (where the mounting device may be initially positioned on a panel joint of a panel assembly) and a closed or clamping position (where the mounting device is secured to a panel joint of a panel assembly). The clamp fastener and an attachment mounting fastener (which may extend at least into the mounting flange, including through the mounting flange) may be disposed both in non-parallel relation to one another and in non-orthogonal relation to one another.

The panel joint receptacle of the mounting device may be configured to receive a panel joint of a panel assembly on which the mounting device is installed. As noted, a first reference plane is orthogonal to a width dimension of this panel joint receptacle, where the width dimension corresponds with the direction in which the first and second clamping members are spaced from one another. A number of characterizations of the mounting device may be made in relation to this first reference plane. One is that an included angle between the first transition section (of the first clamping member) and the first reference plane may be within a range of about 20° to about 40° (e.g., about 30°). Another is that an included angle between the above-noted length dimension of the clamp fastener and the first reference plane may be within a range of about 50° to about 70° (e.g., about 60°). Yet another is that the second clamping member may move axially along a path that is neither parallel with nor perpendicular/orthogonal to this first reference plane.

The mounting flange of the first clamping member may define an uppermost portion of the mounting device when installed on a panel joint of the panel assembly. This mounting flange may include at least one aperture. This aperture could be of any appropriate shape, such as circular or in the form of an elongated slot. The perimeter of this aperture could be threaded or it could lack threads. In any case, this aperture of the mounting flange may be used to secure an attachment to/relative to the mounting flange using at least one attachment mounting fastener. For instance, an attachment of any appropriate type may be positioned on/against a flat surface of the mounting flange. An attachment mounting fastener may be directed through this attachment and at least into the mounting flange (including having this attachment mounting fastener extend all the way through the mounting flange, for instance, such that a nut could then be threaded onto the attachment mounting fastener; further including having the attachment mounting fastener threadably engage with the mounting flange) to secure the attachment to the mounting device. In one embodiment, an upper surface of the mounting device is flat and disposed at least generally parallel with the base sections of panels that collectively define a panel assembly on which the mounting device may be installed.

The first transition section of the first clamping member may include a first un-threaded hole through which the clamp fastener extends. The second transition section of the second clamping member may include a second threaded hole. The clamp fastener may extend through the first clamping member and at least into the second threaded hole of the second transition section for the second clamping member such that the clamp fastener is threadably engaged with this second transition section. Another option would be for the second transition section of the second clamping member to include a second un-threaded hole. The clamp fastener could then extend through each of the first and second transition sections of the first and second clamping members, respectively, and a nut could be threaded onto a free end of this clamp fastener to secure the second clamping member relative to the first clamping member. However, having the second transition section of the second clamping member include a threaded hole provides advantages, including at least substantially retaining the second clamping member in a fixed position relative to the first clamping member for the initial positioning of the mounting device on a panel joint of the panel assembly (e.g., having the mounting device in an assembled state may facilitate the initial positioning of the mounting device on a panel joint of a panel assembly).

The first and second transition sections of the first and second clamping members, respectively, may be disposed in at least substantially parallel relation. In one embodiment, primary surfaces of the first and second transition sections that project toward or face one another are disposed in at least substantially parallel relation to one another. The first and second transition sections may be spaced from one another when the mounting device is initially positioned on a panel joint of a panel assembly, and prior to activating the clamping fastener to secure the mounting device to this panel joint. The clamping fastener may be activated to secure the mounting device to a panel joint of a panel assembly, and which may dispose opposing surfaces of the first and second transition sections in interfacing relation.

The first and second transition sections of the first and second clamping members, respectively, may be disposed in interfacing relation when the first and second clamping members are disposed in a clamping position. The panel joint receptacle may be in the form of an at least generally U-shaped cavity at least when the first and second clamping members are in a clamping position. In any case, the interface between the first and second transition sections may be offset in relation to the panel joint receptacle. Consider the case where a centerline bisects the panel joint receptacle. Instead of the interface between the first and second clamping members being disposed directly above the panel joint receptacle, the entirety of the interface between the first and second clamping members may be positioned on one side of the noted centerline. The first and second panel joint capture sections may be characterized as being asymmetrical relative to a panel joint of a panel assembly on which the mounting device is positioned. For instance, the first panel joint capture section of the first clamping member may capture more of an upper section of a panel joint on which the mounting device is installed compared to the second panel joint capture section of the second clamping member.

The panel joint capture sections of the first and second clamping members may each include sidewall sections. These sidewall sections may be disposed in at least generally parallel relation to one another. In any case, these sidewall sections may be positioned along opposite sidewalls of a panel joint of a panel assembly on which the mounting device is positioned. In one embodiment, a lowermost portion of each of the first and second panel joint capture sections includes a hook or head. The hook on the sidewall section of the first panel joint capture section may project or extend in the direction in which the second panel joint capture section is spaced from the first panel joint capture section. Similarly, the hook on the sidewall section of the second panel joint capture section may project or extend in the direction in which the first panel joint capture section is spaced from the second panel joint capture section. The hooks on the first and second panel joint capture sections may be disposed within recesses or indentations on the corresponding sidewall of a panel joint of a panel assembly on which the mounting devices is installed. In one embodiment, a lowermost portion of only one of the first and second panel joint capture sections includes a hook or head that may be positioned within a recess on the corresponding sidewall of the panel joint of the panel assembly on which the mounting device is installed.

The first and second clamping members may include first and second registration members. These first and second clamping members may be spaced from one another when the clamp fastener is in a first position relative to the second transition section of the second clamping member (e.g., a first degree of threaded engagement between the clamp fastener and the second clamping member). When the second clamp fastener is in a second position relative to this second transition section (e.g., a second degree of threaded engagement between the clamp fastener and the second clamping member, where the second degree of threaded engagement is greater than the first degree of threaded engagement), the first and second registration members may be disposed in mating or interfacing relation. Each of the first and second registration members may be of any appropriate configuration. For instance, one of the registration members may be in the form of a projection, while the other of the registration members may be in the form of a recess, including where the registration members have at least generally complementary shapes. Mating the first and second registration members may reduce the potential of relative movement between the first and second clamping members in at least one dimension when disposed in a clamping position (e.g., to "register" or maintain the first clamping member in a fixed position relative to the second clamping member).

The first transition section of the first clamping member may include the above-noted first registration member, along with a first flat section. The second transition section of the second clamping member may include the above-noted second registration member, along with a second flat section. The first and second flat sections of the first and second clamping members, respectively, may be disposed in interfacing relation (e.g., after activation of the clamp fastener(s) to secure the mounting device to a rib of a panel assembly).

The first clamping member may include a first flat section through which the clamp fastener extends. The second clamping member may include a second flat section that receives the clamp fastener (e.g., a hole, whether threaded or not, may exist on this second flat section). These first and second flat sections may be disposed in interfacing relation. The second clamping member may include an upper flat section, while the underside of the mounting flange of the first clamping member may also include a flat section. The upper flat section of the second clamping member may be disposed in interfacing relation with a flat section on the underside of the mounting flange of the first clamping member. Providing at least one flat surface interface between the first and second transition sections of the first and second clamping members (including in addition to any interfacing or mating registration members), as well as at least one flat surface interface between the second transition section of the second clamping member and the underside of the mounting flange for the first clamping member, may provide enhanced stability for the mounting device when secured to a panel joint of a panel assembly.

The clamp fastener may be characterized as movably interconnecting the second clamping member with the first clamping member. One or more clamp fasteners may be utilized by the mounting device. Multiple clamp fasteners would preferably have their respective length dimensions (e.g., threaded shafts) disposed in at least substantially parallel relation. In one embodiment, the second clamping member (e.g., an entirety thereof) moves along an axial path when adjusting the spacing between the first and second clamping members, for instance by moving the second clamping member along one or more clamp fasteners. The second clamping member may be characterized as moving both upwardly and toward the first clamping member when changing the mounting device from an open or panel joint-loading position to a closed or clamping position.

A building system may include a panel assembly and a mounting device in accordance with the foregoing. The panel assembly may include a first panel joint, and the mounting device may be positioned on this first panel joint. At this time, the mounting flange may be vertically spaced from an uppermost portion of the first panel joint (e.g., with the mounting flange being disposed at a higher elevation than an uppermost portion of the first panel joint) and may define an uppermost portion of the mounting device. The first transition section of the first clamping member may extend from this mounting flange downwardly and in a direction of the panel assembly. The second transition section of the second clamping member may be disposed at a lower elevation than the mounting flange. The first panel joint capture section of the first clamping member may engage a first sidewall of the first panel joint, while the second panel joint capture section of the second clamping member may engage an oppositely disposed second sidewall of the first panel joint. In one embodiment, the second panel joint capture section extends further in the direction of the panel assembly than the first rib capture section. The first clamping member may overly more of an uppermost section of the first panel joint than the second clamping member.

A fourth aspect of the present invention is embodied by an installation method for a building surface having a plurality of panel joints (e.g., spaced from one another in a common dimension). First and second clamping members of a mounting device are positioned relative to a first panel joint of this building surface, where this first clamping member includes a mounting flange. At least one clamp fastener may be activated to move the second clamping member toward the first clamping member. The entirety of the second clamping member moves both in a lateral direction and in an upward direction when moving toward the first clamping member. The first clamping member engages a first sidewall of the first panel joint, and the second clamping member engages a second sidewall of this first panel joint.

A number of feature refinements and additional features are applicable to the fourth aspect of the present invention. These feature refinements and additional features may be used individually or in any combination. The following discussion is applicable to at least the fourth aspect. The mounting device of the first, second, and third aspects may be used in the installation method of this fourth aspect. Features described in relation to the installation method of this fourth aspect may be used by the mounting device of the first, second, and third aspects as well.

The activation of the clamp fastener may be characterized as lifting the second clamping member while maintaining the first clamping member in at least a substantially fixed position relative to the first panel joint. The elevation of the first clamping member may be at least substantially constant throughout activation of the clamp fastener, while the elevation of the second clamp member may change (increase, when moving the mounting device to a closed or clamping position, including a continuous change) from activation of the clamp fastener.

The first and second clamping members may be in an assembled state or condition when initially positioned on the first panel joint (e.g., with the clamp fastener providing an interconnection between the first and second clamping members). The second clamping member may be maintained in at least a substantially fixed position relative to the first clamping member when the mounting device is initially positioned on the first panel joint of the panel assembly.

The first clamping member may include a first hook that is positioned in a first recess on a first sidewall of the first panel joint. The second clamping member may include a second hook that is at least aligned with a second recess on a second sidewall of the first panel joint (e.g., where the second hook may be spaced from the second sidewall of the first panel joint prior to an activation of the clamp fastener that secures the mounting device to the first panel joint). Activating the clamp fastener may not only move the second clamping member relative to each of the first panel joint and the first clamping member, but it may also move the second hook into/further into the second recess on the second sidewall of the first panel joint, for instance such that the second hook will engage the second sidewall of the first panel joint at least within the second recess.

Prior to the activation of the clamp fastener: a) a first flat section of the first clamping member (e.g., other than a registration member) may be disposed in at least generally parallel and spaced relation to a second flat section of the second clamping member (e.g., other than a registration member); and b) a flat upper section of the second clamping member may be disposed in at least generally parallel and spaced relation to a flat section on an underside of the mounting flange of the first clamping member. Activation of the clamp fastener in a manner to secure the mounting device to the first panel joint may dispose the first flat section of the first clamping member in interfacing relation with the second flat section of the second clamping member, and may further dispose the upper flat section of the second clamping member in interfacing relation with a flat section on the underside of the mounting flange of the first clamping member.

Prior to the activation of the clamp fastener: a) a first registration member of the first clamping member may be aligned with but spaced from a second registration member of the second clamping member. Activation of the clamp fastener to secure the mounting device to the first panel joint may bring the first registration member of the first clamping member into interfacing and/or mating relation with the second registration member of the second clamping member.

Activation of the clamp fastener(s) may move the second clamping member along an axial path either toward or away from the first clamping member, for instance depending upon the direction in which the clamp fastener(s) is rotated. The second clamping member may be movable along the clamp fastener(s) to change the spacing between the first and second clamping members. The second clamping member may move along an axial path that is oriented to have both a horizontal component and a vertical component, where the horizontal component coincides with the width dimension of the panel assembly and where the vertical component coincides with a dimension that is orthogonal to a reference plane containing both the length and width dimensions of the panel assembly.

A number of feature refinements and additional features are separately applicable to each of above-noted aspects of the present invention as well. These feature refinements and additional features may be used individually or in any combination in relation to each of these aspects.

An attachment may be positioned on/against the mounting flange of the mounting device and may be secured relative to the mounting device by at least one attachment mounting fastener. In one embodiment, the mounting flange includes a flat surface and the attachment is positioned on/against this flat surface. The attachment may be of any appropriate type and/or configuration. One or more attachment mounting fasteners may be directed through the attachment and may extend into/through the mounting flange to secure the attachment relative to the mounting device. Multiple mounting devices may be installed on the building surface in the above-noted manner to install such an attachment on the building surface.

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that the mounting device includes "a clamp fastener" alone does not mean that the mounting device includes only a single clamp fastener). Moreover, any failure to use phrases such as "at least one" also does not limit the corresponding feature to the singular (e.g., indicating that a mounting device includes "a clamp fastener" alone does not mean that the mounting device includes only a single clamp fastener). Use of the phrase "at least generally" or the like in relation to a particular feature encompasses the corresponding characteristic and insubstantial variations thereof (e.g., indicating that a surface is at least generally flat encompasses the surface being flat). Finally, a reference of a feature in conjunction with the phrase "in one embodiment" does not limit the use of the feature to a single embodiment.

DETAILED DESCRIPTION

Figure 1:
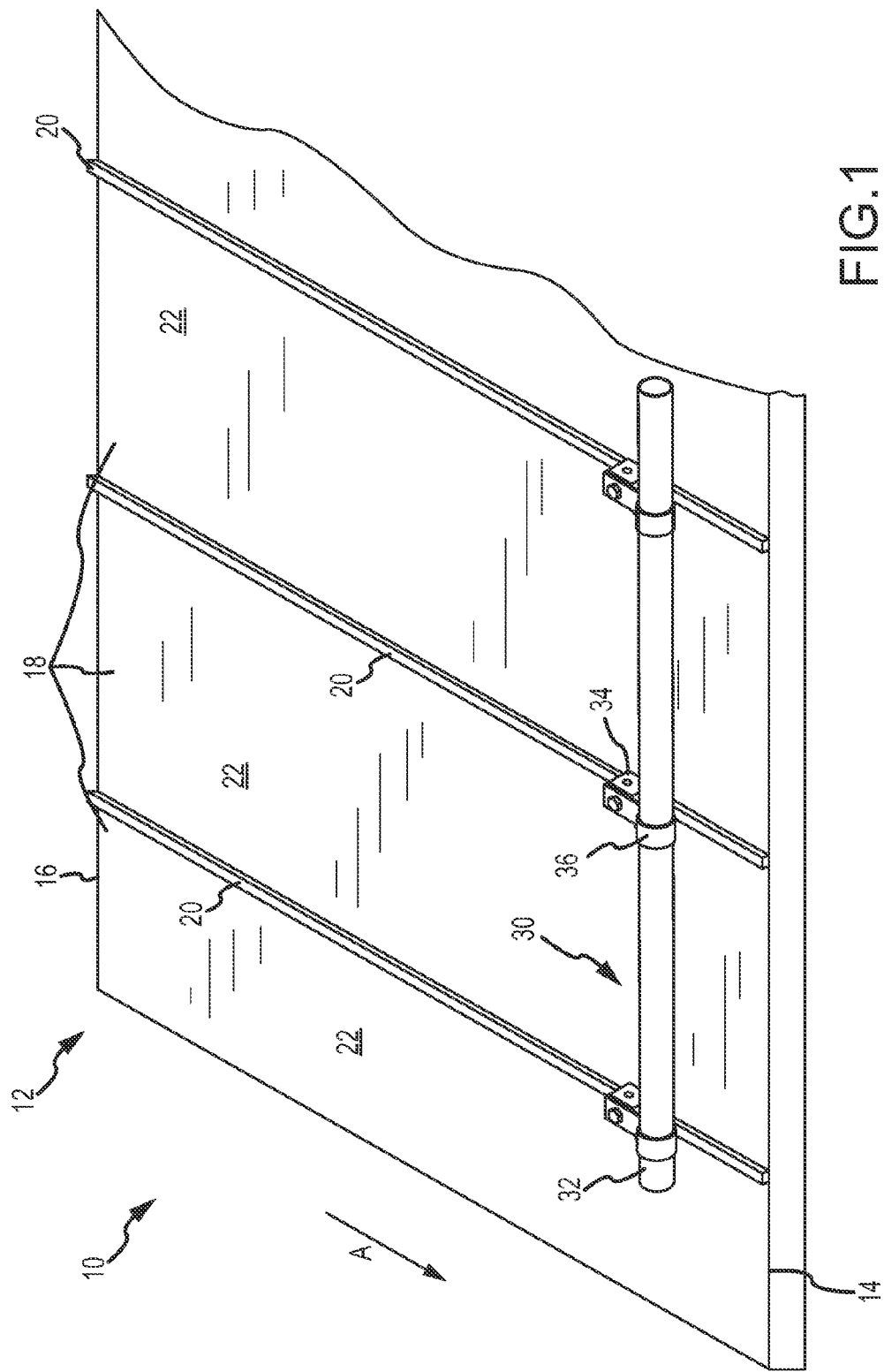
FIG. 1 is a perspective view of one type of attachment (in the form of a cross member assembly for snow retention) installed on a roofing surface.

FIG. 1 presents one embodiment of what may be referred to as a building or roofing system 10 (hereafter "roofing system 10"). The roofing system 10 includes a cross member assembly 30 that is installed on a building/roofing surface 12 (e.g., to provide a snow retention function, and hereafter "roofing surface 12"). Generally, the roofing surface 12 may be defined in any appropriate manner and may be of any appropriate configuration. For instance, the roofing surface 12 may include one or more roofing sections, each of which may be of any appropriate pitch/slope and/or shape. The cross member assembly 30 may be installed at any appropriate location on the roofing surface 12 and in any appropriate manner, and furthermore the cross member assembly 30 may be of any appropriate length. Multiple cross member assemblies 30 may be used and disposed in any appropriate arrangement.

The roofing surface 12 illustrated in FIG. 1 is but one representative configuration that may be utilized by the roofing system 10. The roofing surface 12 may be of any pitch, but at least generally slopes downwardly in a direction denoted by arrow A in FIG. 1 from a peak 16 of the roofing surface 12 to an edge 14 of the roofing surface 12. Multiple panels 18 (e.g., metal panels) collectively define the roofing surface 12. The interconnection of each adjacent pair of panels 18 in the illustrated embodiment defines what may be characterized as a "panel joint." In the illustrated embodiment, the panel joint is in the form of a standing seam 20 (only schematically illustrated in FIG. 1).

The standing seams 20 may at least generally proceed in the direction of or along the slope or pitch of the roofing surface 12 (e.g., the pitch of the length dimension of the standing seams 20 may match the pitch of the corresponding portion of the roofing surface 12). Each panel 18 includes at least one base section 22 that is at least generally flat or planar and that is disposed between each adjacent pair of standing seams 20 on the roofing surface 12. Each panel 18 could include one or more crests, minor ribs, intermediate ribs, striations, fluting, or flutes between its corresponding pair of standing seams 20 so as to provide multiple base sections 22 on each panel 18 (not shown).

The panels 18 may be of any appropriate configuration so to allow them to be interconnected or nested in a manner that defines a standing seam 20, and the standing seams 20 may be disposed in any appropriate orientation relative to the base sections 22 of the panels 18 that define the standing seam 20. Generally, the standing seams 20 may be characterized as at least initially extending orthogonally (e.g., perpendicularly) relative to the base sections 22 of the corresponding panels 18. The illustrated standing seams 20 may be characterized as having a vertical end section, or as being of a vertical standing seam configuration. However, the end sections of the various standing seams 20 could also have portions that are horizontally disposed (e.g., at least generally parallel with the base sections 22 of the corresponding panels 18), or as being of a horizontal standing seam configuration.

The cross member assembly 30 is installed on the roofing surface 12. The cross member assembly 30 generally includes at least one mounting device 34, an adapter 36 for each mounting device 34, and a cross member 32 that extends through at least one adapter 36. That is, each adapter 36 is configured to receive at least a portion of the cross member 32. While the cross member 32 may provide the function of a snow retention device, or a structure that at least attempts to impede or retard the movement of snow and/or ice down the inclined roofing surface 12, the cross member 32 may provide any appropriate function or combination of functions. In any case, the adapter 36 and cross member 32 may be collectively referred to as an "attachment" that is interconnected with the roofing surface 12 by multiple mounting devices 34 in the illustrated embodiment. The mounting devices 34 may be used to install any appropriate type of attachment on the roofing surface 12.

Figure 2:
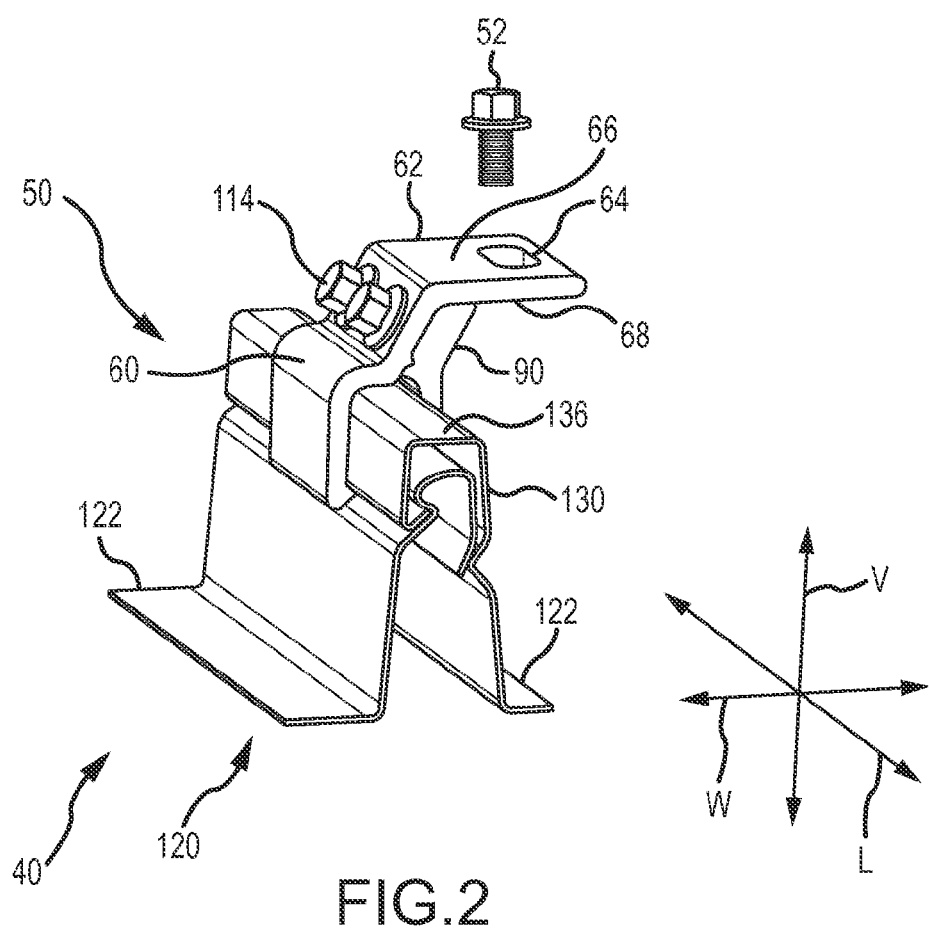
FIG. 2 is a perspective view of one embodiment of a building/roofing system that uses a mounting device that clamps onto a panel joint (in the form of a rib) of a panel assembly via a lifting action.
Figure 3:
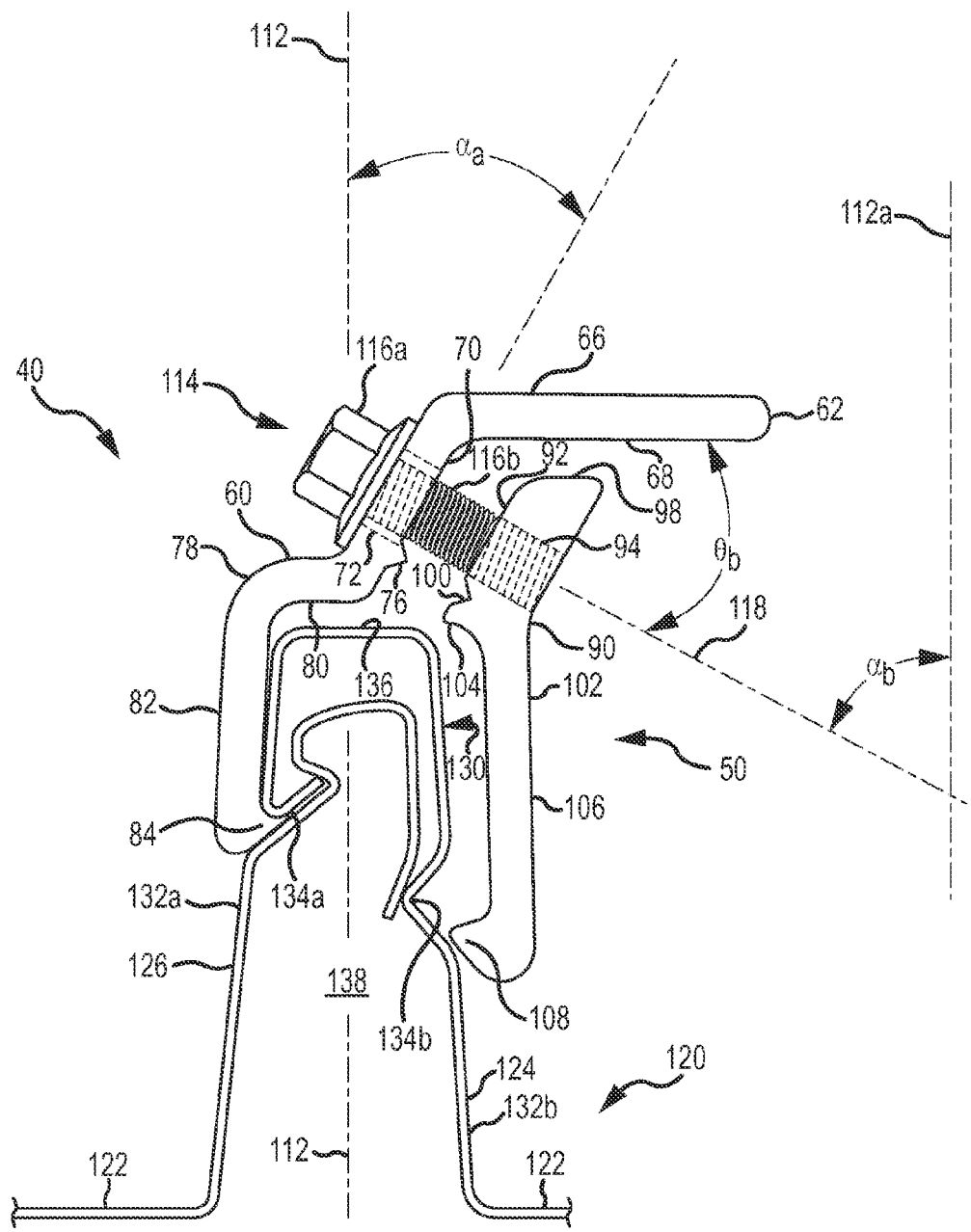
FIG. 3 is an end view of the mounting device positioned on the panel joint of the panel assembly from the building/roofing system of FIG. 2, where the mounting device is in an open or non-clamping configuration.

One embodiment of a building/roofing system is illustrated in FIGS. 2 and 3 and is identified by reference numeral 40. The building system 40 includes at least one mounting device 50 and a panel assembly 120. In the case of the panel assembly 120, each panel joint (the interconnection of a pair of panels 122) is in the form of a hollow rib 130. Typically the building system 40 will utilize a plurality of mounting devices 50 to mount an attachment of any appropriate type/configuration (e.g., cross member assembly 30) to the panel assembly 120. The discussion presented above with regard to the building/roofing surface 12 is equally applicable to the panel assembly 120. For instance, the length dimension of the various ribs 130 of the panel assembly 120 (coinciding with the length dimension of the panel assembly 120) will typically be installed such that their length dimension (into/out of the page and the view shown in FIG. 3) will coincide with or define the pitch when used as a roofing surface and as discussed above. The length dimension L, the width/lateral/horizontal dimension W, and the vertical dimension V of the panel assembly 120 (more generally, for the roofing system 40), are all illustrated in FIG. 2.

Figure 6:
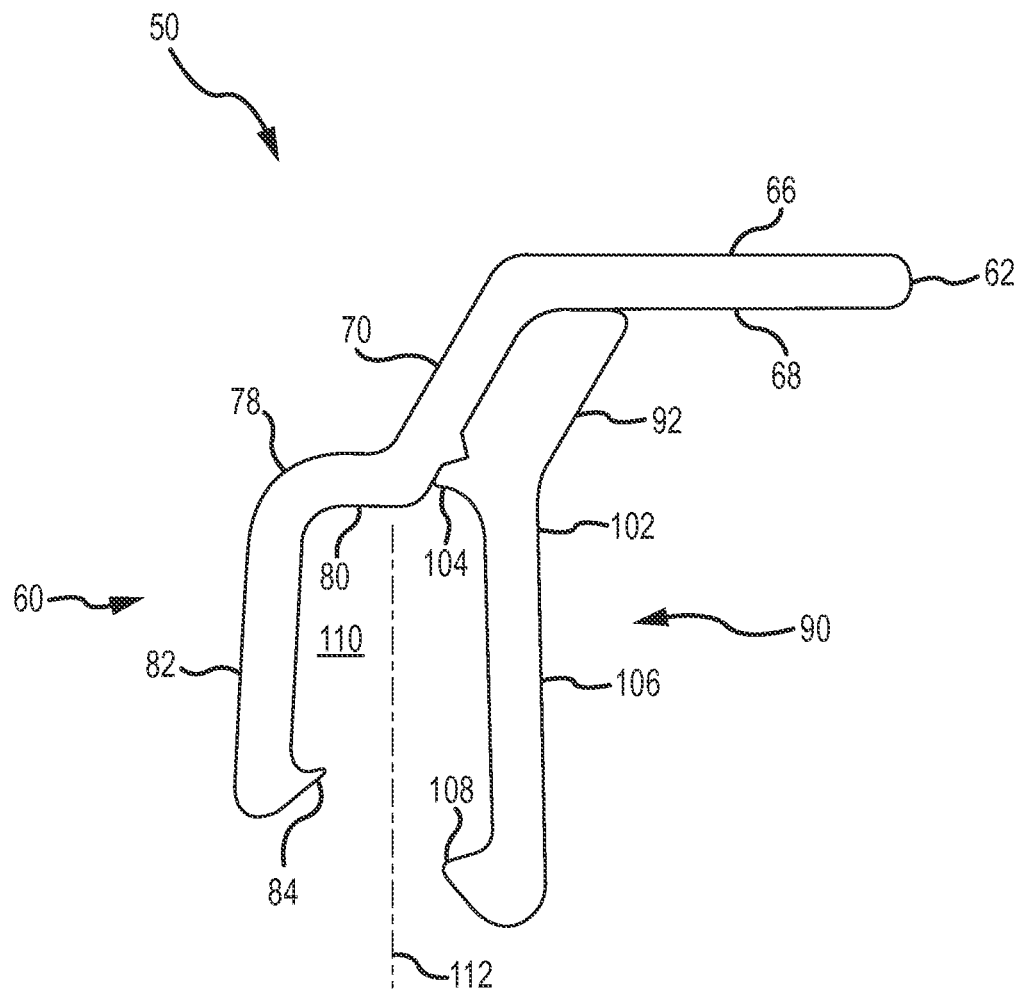
FIG. 6 is an end view of the mounting device shown in FIGS. 2 and 3, illustrating the relative position of the first and second clamping members when secured to a panel joint of a panel assembly.

The mounting device 50 includes a first clamping member 60, a second clamping member 90, a rib or panel joint receptacle 110 (FIG. 6), at least one clamp or clamping fastener 114 (two being utilized in the embodiment of FIG. 2), and typically at least one attachment mounting fastener 52. The rib receptacle 110 is in the form of an open space, and is adapted to receive at least an upper section of a rib 130 of the panel assembly 120. A width dimension of this rib receptacle 110 corresponds with the direction in which the first and second clamping members 60, 90 are spaced from one another (more specifically, the direction in which a sidewall section 82 of the first clamping member 60 is spaced from a sidewall section 106 of the second clamping member 90). The width dimension of the rib receptacle 110 coincides with the width dimension W shown in FIG. 2.

Figure 4:
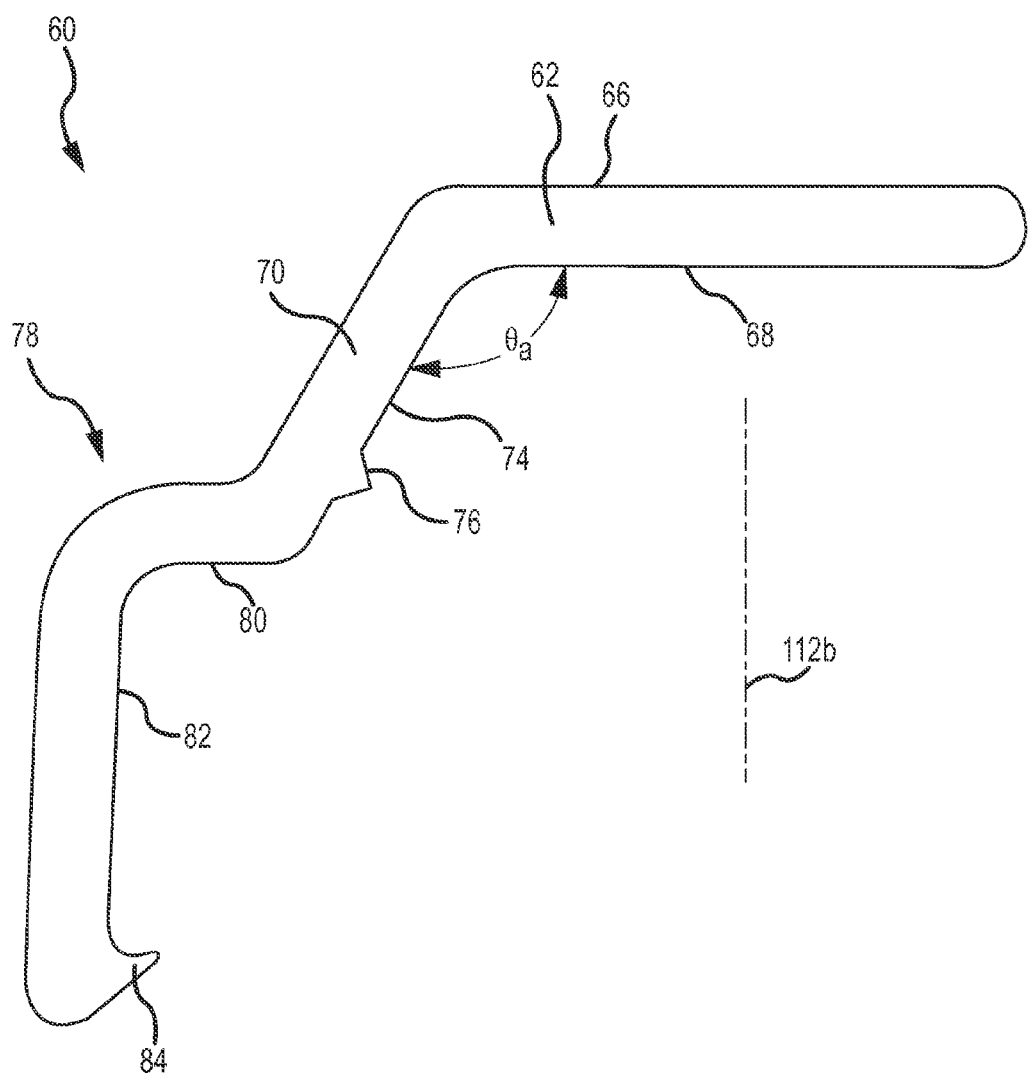
FIG. 4 is an end view of a first clamping member of the mounting device shown in FIGS. 2 and 3.

Referring now to FIGS. 2-4, the first clamping member 60 includes a mounting flange 62, a first transition section 70, and a first rib or panel joint capture section 78. The mounting flange 62 includes an upper surface 66 and an oppositely disposed lower or bottom surface 68 (which may also be characterized as an underside 68 in relation to the installed position). The mounting flange 62 may be disposed in any appropriate orientation. The orientation for the mounting flange 62 shown in the illustrated embodiment may be characterized as "horizontal". This horizontal orientation of the mounting flange 62 disposes the same at least generally parallel to the panel assembly 120 (more specifically, to a reference plane that contains the length and width dimensions of this panel assembly 120). However, the mounting flange 62 could also be vertically disposed (not shown), where the mounting flange 62 would extend perpendicularly or orthogonally to the panel assembly 120 (more specifically, to a reference plane that contains the length and width dimensions of this panel assembly 120).

An aperture 64 extends at least into the mounting flange 62. This aperture 64 may be of any appropriate shape, including circular or in the form of an elongated slot as shown. In one embodiment, the aperture 64 extends completely through the mounting flange 62 and the perimeter that defines this aperture 64 does not include any threads. As such, the attachment mounting fastener 52 may be directed through the aperture 64 without establishing any threaded engagement/interaction with the mounting flange 62. A nut (not shown) may then be threaded onto the free end of the attachment mounting fastener 52 and may be disposed in abutting relation to the underside 68 of the mounting flange 62. However, the perimeter that defines the mounting flange aperture 64 could include threads (not shown) such that there would be a threaded engagement/interaction between the attachment mounting fastener 52 and the mounting flange 62 of the first clamping member 60.

The first transition section 70 of the first clamping member 60 may be characterized as extending away from the mounting flange 62 and away from a reference plane 112*b* that at least generally bisects the mounting flange 62 in its length dimension in the illustrated embodiment (the reference plane 112*b* being parallel with the above-noted reference plane 112 associated with the rib receptacle 110 of the mounting device 50). The first transition section 70 of the first clamping member 60 may also be characterized as extending away from the mounting flange 62 and toward the reference plane 112 associated with the rib receptacle 110. The transition section 70 of the first clamping member 60 may also be characterized as extending downwardly from the mounting flange 62 in the vertical dimension V and laterally relative to the mounting flange 62 in the width dimension W.

The length of the first transition section 70 may be characterized as extending in both the width/lateral dimension W and the vertical dimension V when the mounting device 50 is installed on the panel assembly 120. Another way of characterizing the orientation of the first transition section 70 relative to the mounting flange 62 is via an included angle $\theta_a$ that is defined between the interior surfaces of the mounting flange 62 and the first transition section 70 (where these interior surfaces are those that at least generally project toward or face the panel assembly 120 when the mounting device 50 is positioned on a rib 130 of the panel assembly 120). This included angle $\theta_a$ may be at least about 110° and is less than 180°. One embodiment has this included angle $\theta_a$ being within a range of about 110° to about 130°, while another embodiment has this included angle $\theta_a$ being about 120°.

The orientation of the first transition section 70 of the first clamping member 60 may also be defined in relation to the above-noted reference plane 112 associated with the rib receptacle 110. This reference plane 112 may extend in the vertical dimension V of the panel assembly 120 when the mounting device 50 is installed on the panel assembly 120. The reference plane 112 may also be characterized as extending in a dimension that defines a height dimension of the corresponding rib 130 of the panel assembly 120 when the mounting device 50 is installed on the panel assembly 120. In any case, an included angle $\alpha_a$ exists between the first transition section 70 and the reference plane 112. One embodiment has this included angle $\alpha_a$ being within a range of about 20° to about 40°. Another embodiment has this included angle $\alpha_a$ being about 30°.

At least one flat section 74 (hereafter a "first flat section 74") is incorporated by the first transition section 70 of the first clamping member 60. The above-noted included angle $\theta_a$ may be defined between this first flat section 74 and a flat section on the underside 68 of the mounting flange 62. At least one un-threaded hole 72 (two in the illustrated embodiment) extends completely through the first transition section 70 and intersects with its first flat section 74.

The first transition section 70 also includes a first registration member 76 of any appropriate configuration. In the illustrated embodiment, the first registration member 76 is in the form of a projection. Other shapes may be appropriate from what is illustrated. "Registration" pertains to a positioning aide—to register the position of the first clamping member 60 relative to the second clamping member 90 in a manner that will be discussed in more detail below.

The first rib capture section 78 extends from the first transition section 70. The first rib capture section 78 includes an upper section 80 (extending primarily in the width/lateral dimension W) and a sidewall section 82 (extending primarily in the vertical dimension V). The lowermost portion of the sidewall section 82 includes a first hook or head 84 (e.g., a projection that extends in a direction that the second clamping member 90 is spaced from the first clamping member 60).

Figure 5:
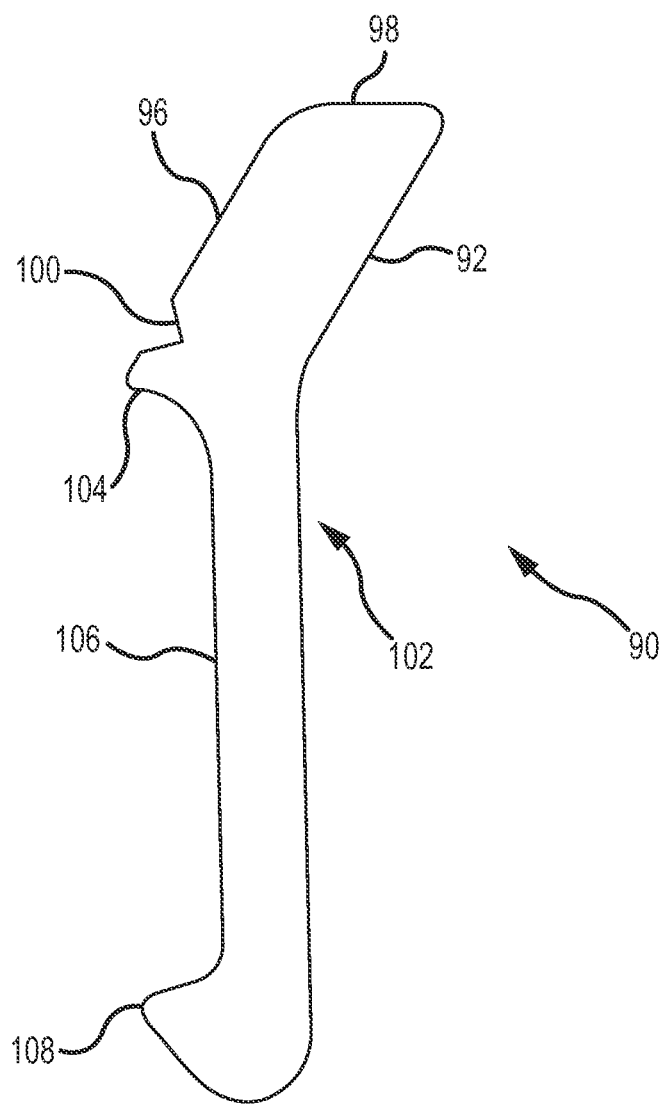
FIG. 5 is an end view of a second clamping member of the mounting device shown in FIGS. 2 and 3.

Referring now to FIGS. 2, 3, and 5, the second clamping member 90 includes a second transition section 92 and a second rib or panel joint capture section 102. The second transition section 92 of the second clamping member 90 is disposed in at least generally opposing relation to the first transition section 70 of the first clamping member 60. The length of the second transition section 92 may be characterized as extending in both the width/lateral dimension W and the vertical dimension V.

At least one flat section 96 (hereafter a "second flat section 96") is incorporated by the second transition section 92 of the second clamping member 90, and projects at least generally toward or faces the first transition section 70. At least one threaded hole 94 (two in the illustrated embodiment) extends completely through the second transition section 90 and intersects with its second flat section 96. The second transition section 92 further includes an upper flat section 98 that projects at least generally in the direction of or faces the underside 68 of the mounting flange 62 of the first clamping member 60.

The second transition section 92 includes a second registration member 100 of any appropriate configuration. In the illustrated embodiment, the second registration member 100 is in the form of a recess or indentation. Other shapes may be appropriate from what is illustrated. "Registration" again pertains to a positioning aide—to register the position of the first clamping member 60 relative to the second clamping member 90 in a manner that will be discussed in more detail below. Generally, the first registration member 76 of the first clamping member 60 is at least generally of a complementary shape to the second registration member 100 of the second clamping member 90.

The second rib capture section 102 of the second clamping member 90 extends from the second transition section 92 of the second clamping member 90, and is disposed in opposing relation to the first rib capture section 78 of the first clamping member 60. The second rib capture section 102 includes a first curved section 104 that is adjacent to the second transition section 92, along with a sidewall section 106 (which extends primarily in the vertical dimension V). The lowermost portion of the sidewall section 106 includes a second hook or head 108 (e.g., a projection that extends in a direction that the second clamping member 90 is spaced from the first clamping member 60).

At least one clamp fastener 114 movably interconnects the first clamping member 60 and the second clamping member 90. Two clamp fasteners 114 are used by the illustrated embodiment. Any appropriate number of clamp fasteners 114 could be utilized, and each of which would be in accordance with the discussion presented herein. Multiple clamp fasteners 114 would typically be disposed in parallel relation to one another. Only one clamp fastener 114 will be described herein, as each will typically be of the same configuration.

The clamp fastener 114 includes a head 116a and a shaft 116b that extends along an axis 118. The shaft 116b of the clamp fastener 114 extends through an unthreaded hole 72 in the first transition section 70 of the first clamping member 60, and may be threaded into the aligned threaded hole 94 in the second transition section 92 of the second clamping member 90.

The orientation of the clamp fastener 114 may be described in relation to the mounting flange 62. An included angle $\theta_b$ may exist between the shaft 116b of the clamp fastener 114 (coinciding with a length dimension of the clamp fastener 114, and coinciding with the axis 118 about which the clamp fastener 114 may be rotated) and the underside 68 of the mounting flange 62. One embodiment has this included angle $\theta_b$ being within a range of about 20° to about 40°. Another embodiment has this included angle $\theta_b$ being about 30°.

The orientation of the clamp fastener 114 may also be described in relation to the above-noted reference plane 112 associated with the rib receptacle 110. An included angle $\alpha_b$ may exist between the shaft 116b of the clamp fastener 114 (coinciding with a length dimension of the clamp fastener 114, and coinciding with the axis 118 about which the clamp fastener 114 may be rotated) and the reference plane 112. The included angle $\alpha_b$ is illustrated in FIG. 3 in relation to a reference plane 112a that is parallel to the reference plane 112 associated with the rib receptacle 110 for clarity. One embodiment has this included angle $\alpha_b$ being within a range of about 50° to about 70°. Another embodiment has this included angle $\alpha_b$ being about 60°.

Prior to fully securing the mounting device 50 to a hollow seam rib 130 of the panel assembly 120 (with each clamp fastener 114 being in a first position relative to the second clamping member 90—e.g., FIG. 3): 1) the first flat section 74 of the first clamping member 60 may be at least substantially parallel to and spaced from the second flat section 96 of the second clamping member 90; and 2) the upper flat section 98 of the second clamping member 90 may be at least substantially parallel to and spaced from the underside 68 of the mounting flange 62 for the first clamping member 60. When the mounting device 50 is secured to a hollow seam rib 130 of the panel assembly 120 and referring now to FIG. 6 (with each clamp fastener 114 being in a second position relative to the second clamping member 90; e.g., the second flat section 96 having been drawn closer to the head 116a of each such clamp fastener 114; each such clamp fastener 114 now having an increased degree of threaded engagement with the second clamping member 90): 1) the first flat section 74 of the first clamping member 60 may be disposed in interfacing relation to the second flat section 96 of the second clamping member 90; and 2) the upper flat section 98 of the second clamping member 90 may be disposed in interfacing relation to the underside 68 of the mounting flange 62 of the first clamping member 60. Also, the first rib capture section 78 and the second rib capture section 102 collectively define the above-noted rib receptacle 110. The rib receptacle 110 may be in the form of an at least generally U-shaped cavity 110 (e.g., FIG. 6).

FIG. 3 presents an enlarged view of the panel assembly 120. The panel assembly 120 may be used to define any appropriate surface, including a roofing surface. The panel assembly 120 is defined by a plurality of panels 122. Each panel 122 includes a left seam rib section 124 (a rib section used to define a hollow seam rib 130), along with a right seam rib section 126 (a rib section used to define hollow seam rib 130). The left seam rib section 124 and right seam rib section 126 of a given panel 122 are spaced in the width or lateral dimension W. Each panel 122 may include one or more flat sections, as well as one or more other structures such as crests, minor ribs, intermediate ribs, pencil ribs, striations, fluting, or flutes.

Generally, the right seam rib section 126 for the left panel 122 in FIGS. 2 and 3 may be positioned over the left seam rib section 124 for the right panel 122 to define a standing seam in the form of a hollow seam rib 130. Multiple panels 122 may be interconnected in this same general manner to define a panel assembly 120 of a desired size (both in the length L and width W dimensions).

Each hollow seam rib 130 of the panel assembly 120 may be characterized as having a first sidewall 132a and an oppositely disposed second sidewall 132b that are disposed in spaced relation, being interconnected by the above-noted upper rib section 136. The first sidewall 132a, upper rib section 136, and second sidewall 132b collectively define at least one open space 138 within the interior of the seam rib 130. The first sidewall 132a includes an indentation or recess 134a on an exterior of the seam rib 130, while the second sidewall 132b includes an indentation or recess 134b on an exterior of the seam rib 130. The indentations 134a and 134b are disposed at different elevations along the height of the seam rib 130 in the illustrated embodiment ("height" being in the vertical dimension V).

In preparation for installing the mounting device 50 on a seam rib 130 of the panel assembly 120, the clamp fastener(s) 114 used by the mounting device 50 may be activated (e.g., rotated about their respective axis 118) to increase the spacing between the first clamping member 60 and the second clamping member 90 (e.g., FIG. 3). Rotation of the clamp fastener(s) 114 in one direction (an opening or unclamping direction) moves the second clamping member 90 along the axis 118 of each clamp fastener 114 away from the first clamping member 60 (an axial movement of the second clamping member 90). In one embodiment, the clamp fastener(s) 114 may be adjusted to provide a spacing between the first clamping member 60 and the second clamping member 90 that is at least as great as the maximum width of the seam rib 130 over which the mounting device 50 will need to be positioned to dispose the mounting device 50 in the position illustrated in FIG. 3.

Throughout the positioning of the mounting device 50 on a seam rib 130, the first clamping member 60 and the second clamping member 90 may remain interconnected by one or more clamping fasteners 114. Moreover, the threaded engagement between each clamp fastener 114 and the second clamping member 90 may facilitate the initial positioning of the mounting device 50 on a seam rib 130 by maintaining the second clamping member 90 in an at least substantially fixed position relative to the first clamping member 60. At least an upper section of the hollow seam rib 130 of the standing seam panel assembly 120 is ultimately received within the rib receptacle 110 collectively defined by the first rib capture section 78 of the first clamping member 60 and the second rib capture section 102 of the second clamping member 90. The first hook 84 of the first clamping member 60 may be positioned within the first recess 134a on the first sidewall 132a of the seam rib 130. The second hook 108 of the second clamping member 90 is aligned with the second recess 134b on the second sidewall 132b of the seam rib 130 (and may partially extend into this second recess 134b). The second hook 108 of the second clamping member 90 is also disposed at a lower elevation than the second recess 134b at this time (disposed further toward the panel assembly 120 in the vertical dimension V).

The mounting device 50 may be in an assembled state or condition when initially positioned on a rib 130, as described above. Another option would be to separate the first clamping member 60 from the second clamping member 90 (e.g., unthread each clamp fastener 114 from the second clamping member 90). The first clamping member 60 may be individually positioned alongside the sidewall 132a of the rib 130, with the first hook 84 being positioned within the first recess 134a on the first sidewall 132a of the seam rib 130. The second clamping member 90 may be individually positioned alongside the sidewall 132b of the rib 130. One or more clamp fasteners 114 may be directed through the first transition section 70 of the first clamping member 60 and may be threaded to the second clamping member 90 (more specifically, the second transition section 92). The mounting device 50 may then be secured to the rib 130 of the panel assembly 120 in a manner that will now be described.

Activating the clamp fastener(s) 114 of the mounting device 50 (e.g., via rotation about the corresponding axis 118) secures the mounting device 50 to the seam rib 130. Rotation of the clamp fastener(s) 114 of the mounting device 50 moves the second clamping member 90 along the axis 118 of each clamp fastener 114 (an axial movement of the second clamping member 90). Rotating the clamp fastener(s) 114 in one direction (a closing or clamping direction) moves the second clamping member 90 along the axis 118 of each clamp fastener 114 in the direction of the first clamping member 60 (an axial movement of the second clamping member 90). Based upon the above-noted orientation of the axis 118 of each clamp fastener 114 for the mounting device 50, this moves the second clamping member 90 both in the width or lateral dimension W toward the first clamping member 60 (right-to-left in the view shown in FIG. 3) and upwardly toward the first clamping member 60 (bottom-to-top in the view shown in FIG. 3; upwardly in the vertical dimension V). As the mounting device 50 is being secured to a seam rib 130 by the noted rotation of the clamp fastener(s) 114, the first clamping member 60 may remain in an at least substantially fixed position/elevation relative to the seam rib 130, while the elevation of the second clamping member 90 relative to the seam rib 130 may continually/progressively increase (e.g., the second clamping member 90 may be lifted relative to the first clamping member 60, and while the first clamping member 60 remains at generally at the same elevation). This should direct the second hook 108 into/further into the recess 134b on the second sidewall 132b of the seam rib 130 and possibly into contact with the second sidewall 132b. The second clamping member 90 may also be characterized as moving along an axial path that is neither parallel to the reference plane 112 associated with the rib receptacle 110 nor perpendicular/orthogonal to the reference plane 112.

Rotating each clamp fastener(s) 114 in a closing or clamping direction also: 1) disposes the first flat section 74 of the first clamping member 60 in interfacing relation to the second flat section 96 of the second clamping member 90; 2) disposes the upper flat section 98 of the second clamping member 90 in interfacing relation to the underside 68 of the mounting flange 62 of the first clamping member 60; and 3) disposes the first registration member 76 in interfacing/mating relation with the second registration member 100. Having at least two flat sections of the first clamping member 60 (in addition to the first registration member 76) being disposed in interfacing relation with corresponding flat sections of the second clamping member 90 (in addition to the second registration member 100) should enhance the stability of the mounting device 50 when secured to a seam rib 130 of the panel assembly 120. However, disposing the first registration member 76 in interfacing and/or mating relation with the second registration 100 may also enhance the stability of the mounting device 50 when installed on the panel assembly 120, for instance by reducing the potential for relative movement in at least one dimension between the first clamping member 60 and the second clamping member 90 when secured to the panel assembly 120.

Figure 7A:
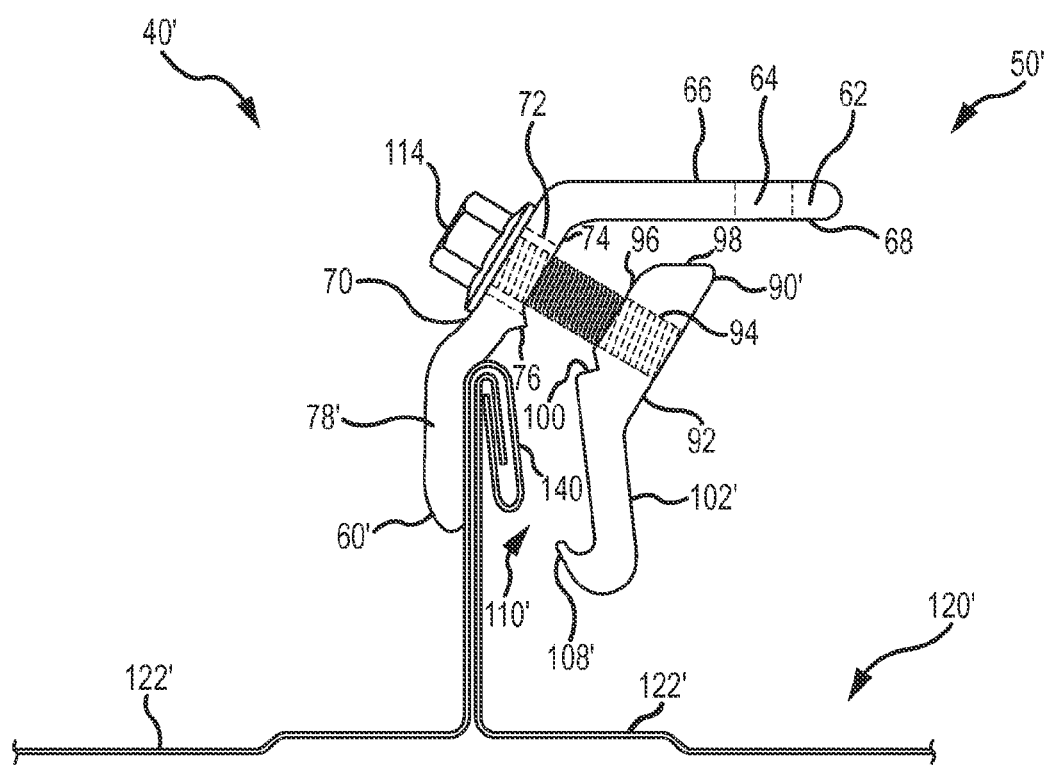
FIG. 7A is an end view of another embodiment of a mounting device positioned on a panel joint (in the faun of a double fold seam) of a panel assembly for a building/roofing system, where the mounting device is in an open or non-clamping configuration in relation to the illustrated panel joint, and where the mounting device may be clamped onto the panel joint via a lifting action.
Figure 7B:
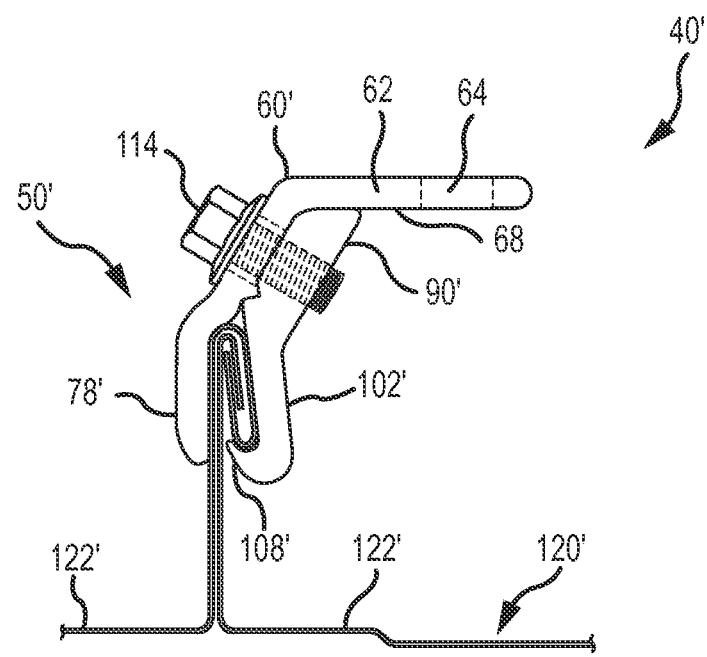
FIG. 7B is another end view of the mounting device and panel joint of FIG. 7A, with the mounting device being in a closed or clamping configuration in relation to this panel joint.
Figure 7C:
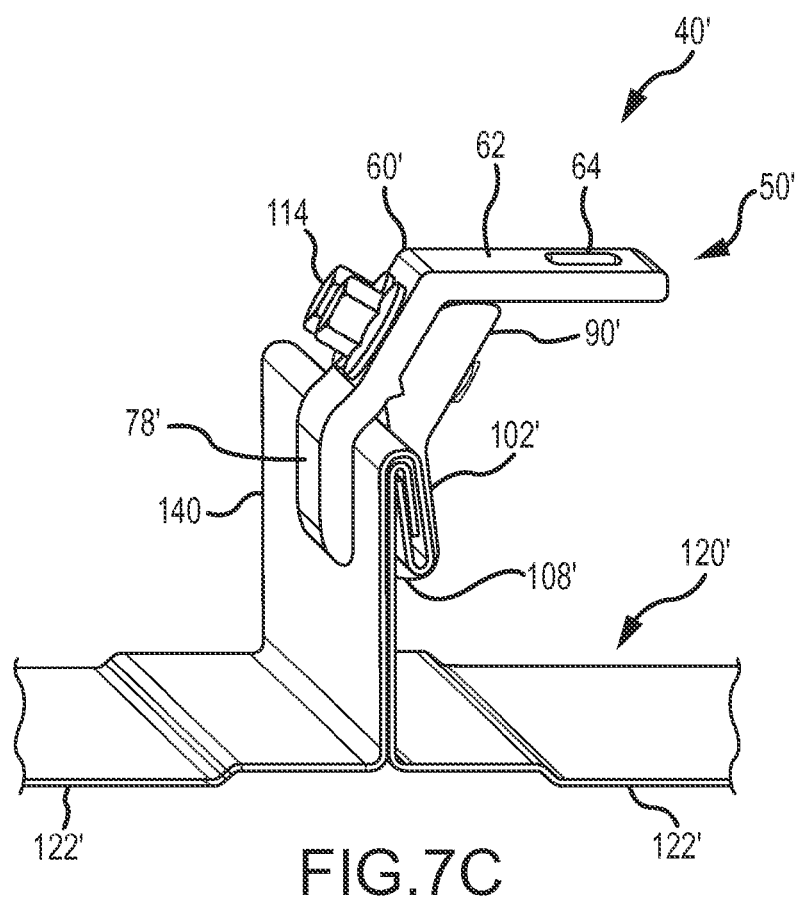
FIG. 7C is a perspective view of the mounting device and panel joint of FIG. 7A, with the mounting device being in a closed or clamping configuration in relation to this panel joint.

FIGS. 7A-7C are directed to another embodiment of a building/roofing system that is identified by reference numeral 40'. Corresponding components between the embodiment of FIGS. 2-6 and the embodiment of FIGS. 7A-7C are identified by the same reference numerals. Those corresponding components that differ in at least one respect are further identified by a "single prime" designation in FIGS. 7A-7C.

One difference between the embodiment of FIGS. 2-6 and the embodiment of FIGS. 7A-7C is that the panel assembly 120' of FIGS. 7A-7C is of a different configuration than that shown in FIGS. 2 and 3. Adjacent panels 122' of the panel assembly 120' in FIGS. 7A-7C are interconnected to define a panel joint in the form of a double fold seam 140 (compared to hollow ribs 130 in the case of the panel assembly 120 shown in FIGS. 2 and 3). The mounting device 50' of the embodiment of FIGS. 7A-7C has also been adapted for use with the illustrated double fold seam 140.

The mounting device 50' includes a first clamping member 60' having a first transition section 70 and a mounting flange 62 that are each in accordance with the corresponding components of the mounting device 50 of FIGS. 2-6. One difference between the first clamping member 60' of FIGS. 7A-7C and the first clamping member 60 of FIGS. 2-6 is the configuration of the first panel joint capture section 78'. The first panel joint capture section 78' in effect eliminates (or reduces the width of) the upper section 80 used by the first clamping member 60 of FIGS. 2-6. The first panel joint capture section 78' also lacks the hook 84 that is used by the first clamping member 60 of FIGS. 2-6. In any case, the first panel joint capture section 78' of the first clamping member 60' is at least generally vertically disposed (e.g., disposed at least generally orthogonal to the panel assembly 120') and interfaces with one side of the double fold seam 140 when installed on the panel assembly 120'.

The mounting device 50' includes a second clamping member 90' having a second transition section 92 that is in accordance with the corresponding component of the mounting device 50 of FIGS. 2-6. The primary difference between the second clamping member 90' of FIGS. 7A-7C and the second clamping member 90 of FIGS. 2-6 is the configuration/orientation of the second panel joint capture section 102', which has been adapted for use with the double fold seam 140. Generally, the second panel joint capture section 102' extends from the second transition section 92 of the second clamping member 90' in the direction of the panel assembly 120' in a divergent manner in relation to the first panel joint capture section 78' of the first clamping member 60'. The spacing between the first panel joint capture section 78' of the first clamping member 60' and the second panel joint capture section 102' of the second clamping member 90' progressively increases proceeding in the direction of the panel assembly 120'.

When the mounting device 50' is initially installed on the double fold seam 140 of the panel assembly 120' (e.g., FIG. 7A), the first panel joint capture section 78' of the first clamping member 60' may be positioned against one side of the double fold seam 140, the double fold seam 140 may be received within the panel joint receptacle 110' of the mounting device 50', and the second panel joint capture section 102' of the second clamping member 90' may be spaced from the opposite side of the double fold seam 140. The clamp fastener(s) 114 may then be activated to clamp the mounting device 50' onto the panel assembly 120' in the same manner discussed above in relation to the mounting device of FIGS. 2-6. For instance and in the closed or clamped configuration (e.g., FIGS. 7B and 7C): 1) the second panel joint capture section 102' of the second clamping member 90' should be disposed against the opposite side of the double fold seam 140 (compared to the first panel joint capture section 78' of the first clamping member 60'); 2) a hook 108' on the end of the second panel joint capture section 102' of the second clamping member 90' should extend upwardly into an interior space within the double fold seam 140; 3) the upper flat section 98 of the second clamping member 90' should be disposed against a flat surface on the underside 68 of the first clamping member 60; and 4) the first flat section 74 of first clamping member 60' should be disposed against the second flat section 96 of the second clamping member 90'.

Figure 8A:
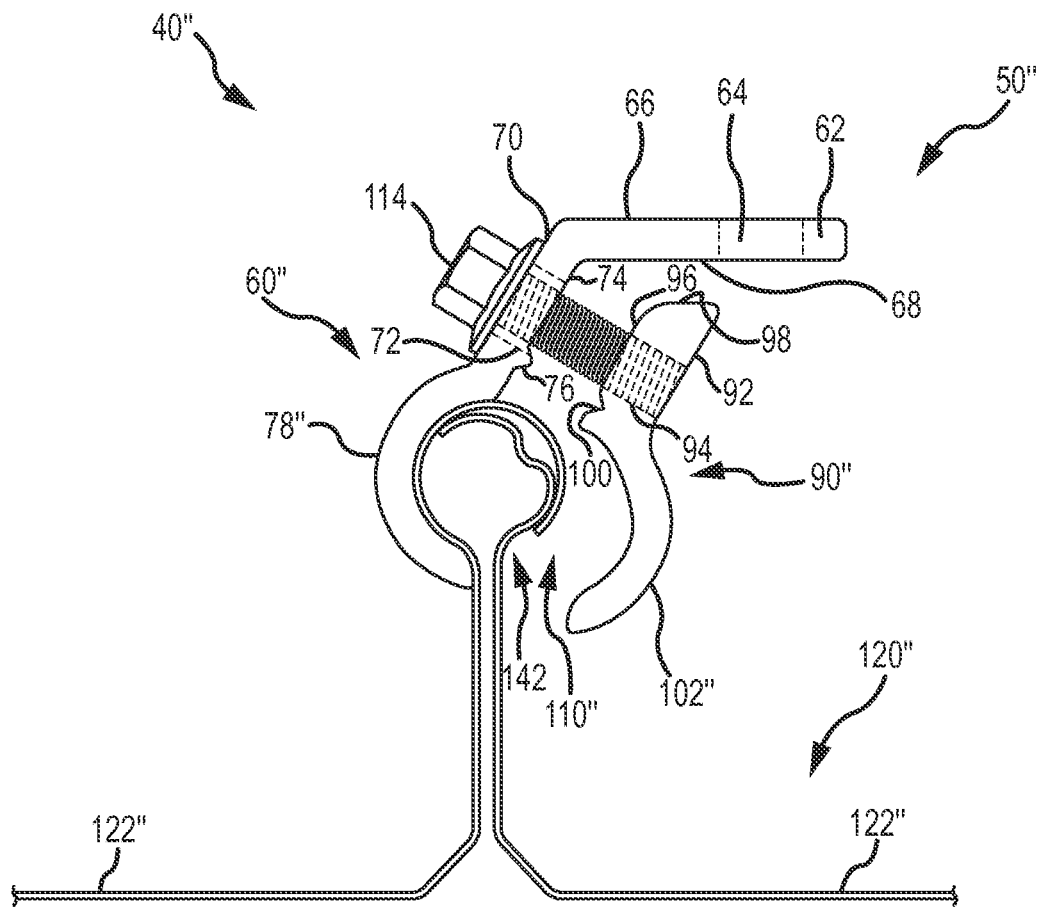
FIG. 8A is an end view of another embodiment of a mounting device positioned on a panel joint (in the form of a bulb seam) of a panel assembly for a building/roofing system, where the mounting device is in an open or non-clamping configuration in relation to the illustrated panel joint, and where the mounting device clamps onto the panel joint via a lifting action.
Figures 8B, 8C:
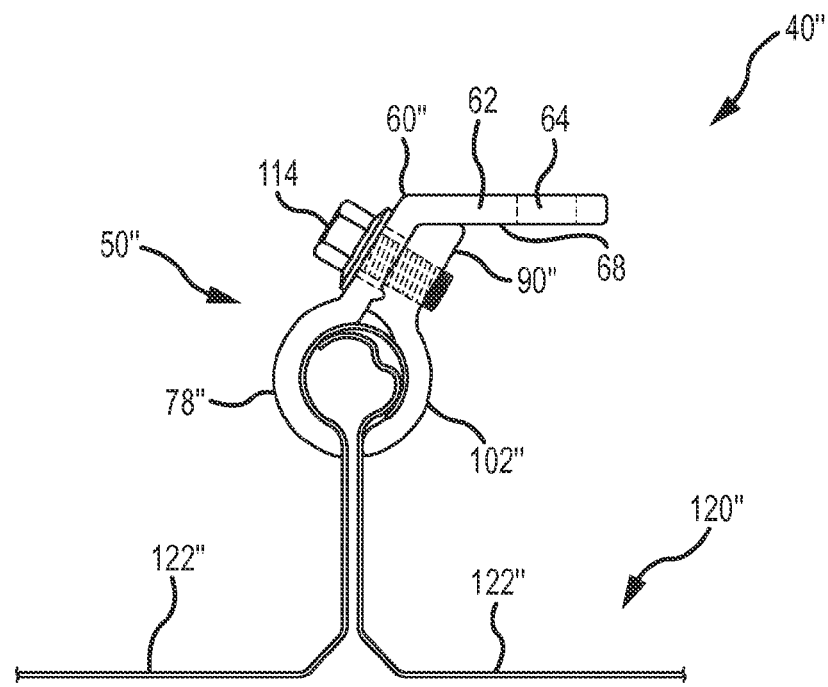
FIG. 8B is another end view of the mounting device and panel joint of FIG. 8A, with the mounting device being in a closed or clamping configuration in relation to this panel joint.
FIG. 8C is a perspective view of the mounting device and panel joint of FIG. 8A, with the mounting device being in a closed or clamping configuration in relation to this panel joint.

FIGS. 8A-8C are directed to another embodiment of a building/roofing system that is identified by reference numeral 40". Corresponding components between the embodiment of FIGS. 2-6 and the embodiment of FIGS. 8A-8C are identified by the same reference numerals. Those corresponding components that differ in at least one respect are further identified by a "double prime" designation in FIGS. 8A-8C.

One difference between the embodiment of FIGS. 2-6 and the embodiment of FIGS. 8A-8C is that the panel assembly 120" of FIGS. 8A-8C is of a different configuration than that shown in FIGS. 2 and 3. Adjacent panels 122" of the panel assembly 120" in FIGS. 8A-8C are interconnected to define a panel joint in the form of what is commonly referred to as a bulb seam 142 (compared to hollow ribs 130 in the case of the panel assembly 120 shown in FIGS. 2 and 3). The mounting device 50" of the embodiment of FIGS. 8A-8C has also been adapted for use with the illustrated bulb seam 142.

The mounting device 50" includes a first clamping member 60" having a first transition section 70 and a mounting flange 62 that are each in accordance with the corresponding components of the mounting device 50 of FIGS. 2-6. One difference between the first clamping member 60" of FIGS. 8A-8C and the first clamping member 60 of FIGS. 2-6 is the configuration of the first panel joint capture section 78". The entirety of the first panel joint capture section 78" is arcuately-shaped (e.g., at least generally semi-circular). The first panel joint capture section 78" also lacks the hook 84 that is used by the first clamping member 60 of FIGS. 2-6. In any case, the first panel joint capture section 78" of the first clamping member 60" interfaces with one side of the bulb seam 142 when installed on the panel assembly 120".

The mounting device 50" includes a second clamping member 90" having a second transition section 92 that is in accordance with the corresponding component of the mounting device 50 of FIGS. 2-6. The primary difference between the second clamping member 90" of FIGS. 8A-8C and the second clamping member 90 of FIGS. 2-6 is the configuration/orientation of the second panel joint capture section 102", which has been adapted for use with the bulb seam 142. The entirety of the second panel joint capture section 102" is arcuately-shaped (e.g., at least generally semi-circular).

When the mounting device 50" is initially installed on the bulb seam 142 of the panel assembly 120" (e.g., FIG. 8A), the first panel joint capture section 78" of the first clamping member 60" may be positioned against one side of the bulb seam 142, the bulb seam 142 may be received within the panel joint receptacle 110" of the mounting device 50", and the second panel joint capture section 102" of the second clamping member 90" may be spaced from the opposite side of the bulb seam 142. The clamp fastener(s) 114 may then be activated to clamp the mounting device 50" onto the panel assembly 120" in the same manner discussed above in relation to the mounting device of FIGS. 2-6. For instance and in the closed or clamped configuration (e.g., FIGS. 8B and 8C): 1) the second panel joint capture section 102" of the second clamping member 90" should be disposed against the opposite side of the bulb seam 142 (compared to the first panel joint capture section 78" of the first clamping member 60"); 2) the upper flat section 98 of the second clamping member 90" should be disposed against a flat surface on the underside 68 of the first clamping member 60"; and 3) the first flat section 74 of first clamping member 60" should be disposed against the second flat section 96 of the second clamping member 90".

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A mounting device attachable to a panel joint of a panel assembly, comprising:
    a first clamping member comprising:
        a mounting flange comprising first and second oppositely disposed surfaces that define a thickness of said mounting flange;
        a first transition section that is disposed in a different orientation than said mounting flange, wherein said first transition section comprises a first flat section; and
        a first panel joint capture section, wherein said first transition section extends between said mounting flange and said first panel joint capture section;
    a second clamping member comprising:
        a second transition section disposed in at least generally opposing relation to said first transition section, wherein said second transition section comprises a second flat section; and
        a second panel joint capture section disposed in at least generally opposing relation to said first panel joint capture section;
    a panel joint receptacle collectively defined by said first and second panel joint capture sections and in the form of an open space, wherein a first reference plane is orthogonal to a width dimension of said panel joint receptacle and extends in a height dimension of a panel joint of a panel assembly when said mounting device is installed on the panel joint of the panel assembly, wherein said width dimension of said panel joint receptacle corresponds with a direction in which said first panel joint capture section and said second panel joint capture section are spaced from one another, wherein an included angle between said first transition section and said first reference plane is within a range of about 20° to about 40°, wherein a second reference plane is parallel to said first reference plane and intersects said mounting flange, and wherein said first transition section proceeds away from said second reference plane in said first transition section extending from said mounting flange to said first panel joint capture section; and
    a clamp fastener that extends through said first transition section of said first clamping member and that at least extends into said second transition section of said second clamping member, wherein said clamp fastener extends through said first flat section of said first transition section and is received by said second flat section of said second transition section, and wherein said first and second flat sections are disposed in interfacing relation when said first and second clamping members are disposed in a clamping position.

2. The mounting device of claim 1, wherein said mounting flange defines an uppermost portion of said mounting device when said mounting device is installed on the panel joint of the panel assembly.

3. The mounting device of claim 1, wherein said mounting flange comprises an un-threaded aperture.

4. The mounting device of claim 3, further comprising;
    an attachment mounting fastener that extends through said un-threaded aperture of said mounting flange.

5. The mounting device of claim 1, wherein said included angle between said first transition section and said first reference plane is about 30°.

6. The mounting device of claim 1, wherein said first transition section comprises a first un-threaded hole through which said clamp fastener extends.

7. The mounting device of claim 6, wherein said second transition section comprises a threaded hole, and wherein said clamp fastener is threaded into said threaded hole.

8. The mounting device of claim 1, wherein said first and second transition sections are disposed in at least substantially parallel relation.

9. The mounting device of claim 1, wherein an interface between said first and second transition sections is offset in relation to said panel joint receptacle when said first and second clamping members are disposed in said clamping position where said first and second flat sections of said first and second transition sections, respectively, are disposed in said interfacing relation.

10. The mounting device of claim 1, wherein an underside of said first panel joint capture section comprises a flat section that is adjacent to said first transition section of said first clamping member and that is disposable above an upper section of the panel joint of the panel assembly when said mounting device is attached to the panel joint, and wherein an underside of said second panel joint capture section comprises a first curved section that is adjacent to said second transition section of said second clamping member.

11. The mounting device of claim 1, wherein a lowermost portion of each of said first and second panel joint capture sections comprises a hook.

12. The mounting device of claim 1, wherein a lowermost portion of at least one of said first and second panel joint capture sections comprises a hook.

13. The mounting device of claim 1, wherein said first clamping member comprises a first registration member, wherein said second clamping member comprises a second registration member, wherein said first and second registration members are spaced apart when said clamp fastener is in a first position relative to said second transition section of said second clamping member, and wherein said first and second registration members are disposed in mating relation when said clamp fastener is in a second position relative to said second transition section of said second clamping member.

14. The mounting device of claim 13, wherein said first transition section of said first clamping member comprises said first registration member, and wherein said second transition section of said second clamping member comprise said second registration member.

15. The mounting device of claim 1, wherein an included angle between a length dimension of said clamp fastener and said first reference plane is within a range of about 50° to about 70°.

16. The mounting device of claim 15, wherein said included angle between said length dimension of said clamp fastener and said first reference plane is about 60°.

17. The mounting device of claim 15, wherein said second clamping member is axially movable along said clamp fastener to change a spacing between said first and second clamping members.

18. The mounting device of claim 1, wherein said second clamping member moves axially along a path that is neither parallel with nor orthogonal to said first reference plane.

19. The mounting device of claim 18, wherein said second clamping member moves upwardly and toward said first clamping member to dispose said first and second clamping members in said clamping position.

20. The mounting device of claim 1, wherein said second clamping member comprises an upper flat section, wherein said second surface of said mounting flange comprises an underside of said mounting flange, wherein said underside of said mounting flange comprises a flat section, and wherein said upper flat section of said second clamping member is disposed in interfacing relation with said flat section on said underside of said mounting flange when said first and second clamping members are disposed in said clamping position.

21. The mounting device of claim 1, wherein said clamp fastener is threaded, wherein said clamp fastener extends through an un-threaded hole of said first transition section for said first clamping member, and wherein said second transition section of said second clamping member comprises a threaded hole that receives said clamp fastener such that said clamp fastener and said second transition section are threadably engaged.

22. A building system comprising a panel assembly and the mounting device of claim 1, wherein said panel assembly comprises a first panel joint, wherein said mounting device is positioned on said first panel joint, wherein said mounting flange is disposed at a higher elevation than an uppermost portion of said first panel joint and defines an uppermost portion of said mounting device, wherein said first transition section extends from said mounting flange downwardly in a direction of said panel assembly, wherein said second transition section is disposed at a lower elevation than said mounting flange, wherein said first panel joint capture section engages one side of said first panel joint, and wherein said second panel joint capture section engages an opposite side of said first panel joint.

23. The building system of claim 22, further comprising:
an attachment positioned against said mounting flange; and
an attachment mounting fastener that extends through said attachment and at least into said mounting flange.

24. The building system claim 22, wherein said first panel joint is selected from the group consisting of a hollow rib, a standing seam, a bulb seam, and a double fold seam.

25. The mounting device of claim 13, wherein one of said first registration member and said second registration member comprises a projection, and wherein the other of said first registration member and said second registration member comprises a recess.

26. The mounting device of claim 1, wherein said mounting flange further comprises an aperture.

27. The mounting device of claim 1, wherein when said mounting device is installed on the panel joint, said first transition section extends upwardly from the panel joint in extending from said first panel capture section to said mounting flange.

28. The mounting device of claim 1, wherein said mounting device comprises a first configuration where said first flat section of said first transition section is spaced from, faces, and is at least substantially parallel to said second flat section of said second transition section, and wherein said mounting device comprises a second configuration where activating said clamp fastener disposes said first and second flat sections in said interfacing relation by said first and second clamping members being disposed in said clamping position.

* * * * *

UNITED STATES PATENT AND TRADEMARK OFFICE
CERTIFICATE OF CORRECTION

PATENT NO. : 9,086,185 B2  
APPLICATION NO. : 13/724976  
DATED : July 21, 2015  
INVENTOR(S) : Dustin M. M. Haddock Page 1 of 1

It is certified that error appears in the above-identified patent and that said Letters Patent is hereby corrected as shown below:

Claims

At Column 19, line 54, Claim 1 delete "the extra space after 40° and before the ,".

At Column 20, line 59, Claim 14 delete "comprise" and insert therefor --comprises--.

Signed and Sealed this  
Twenty-ninth Day of December, 2015

Michelle K. Lee  
*Director of the United States Patent and Trademark Office*